United States Patent Office 3,743,632
Patented July 3, 1973

3,743,632
MONOAZO COMPOUNDS CONTAINING A SUBSTITUTED PHTHALIMIDE DIAZO COMPONENT
Walter Horstmann, Cologne, and Edgar Siegel, Leverkusen, Germany, assignors to Bayer Aktiengesellschaft, Leverkusen, Germany
No Drawing. Filed Aug. 28, 1970, Ser. No. 67,975
Claims priority, application Germany, Sept. 3, 1969, P 19 44 702.0
Int. Cl. C09b 29/20, 29/32, 29/38
U.S. Cl. 260—152                                4 Claims

ABSTRACT OF THE DISCLOSURE

Monoazo dyestuffs which are free from sulphonic acid groups and correspond to the general formula

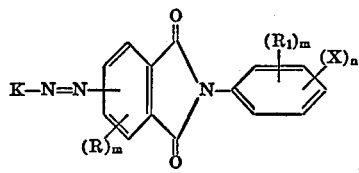

in which K denotes the radical of a monofunctional coupling component; R and $R_1$ stand for identical or different substituents; X means an optionally substituted carboxylic acid hydrazide group; m stands for an integer from 0 to 3; and n stands for the numbers 1 or 2, as well as processes for their production and their use as pigment dyestuffs.

The subject-matter of the present invention comprises valuable new monoazo dyestuffs which are free from sulphonic acid groups and correspond to the general formula

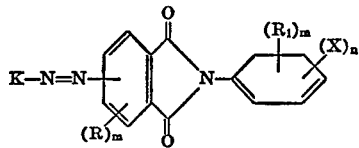
(I)

in which K denotes the racial of a monofunctional coupling components; R and $R_1$ stand for identical or different substituents; X means an optionally substituted carboxylic acid hydrazide group; m stands for an integer from 0 to 3; and n stands for the numbers 1 or 2, as well as processes for their production and their use as pigment dyestuffs.

Suitable radicals X are, for example, carboxylic acid hydrazide radicals which are substituted by acyl, alkyl, aralkyl or aryl radicals.

Suitable acyl radicals are, for example, alkylcarbonyl, arylcarbonyl, especially phenylcarbonyl or phthaloyl radicals which may be substituted by lower alkoxy groups, lower alkyl groups, phenyl groups, halogen, nitro or alkylcarbonyl-amino groups; and also cycloalkylcarbonyl radicals.

Suitable alkyl radicals are primarily those with 1–4 carbon atoms.

Suitable aralkyl radicals are primarily benzyl radicals which may be substituted by halogen, nitro, alkyl or alkoxy radicals.

Suitable aryl radicals are primarily phenyl radicals which may be substituted by halogen, nitro, alkyl or alkoxy groups.

Suitable radicals X are, for example:

—CO—NH—NH—CO—CH₃, —CO—NH—NH₂, —CO—NH—NH—CH₃,

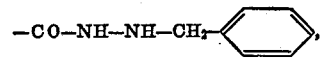

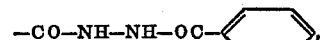

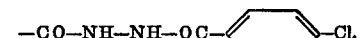

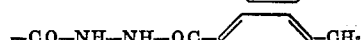

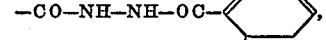

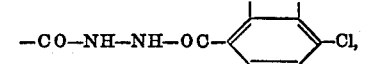

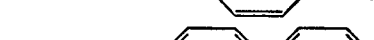

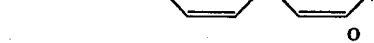

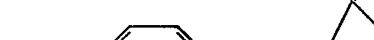

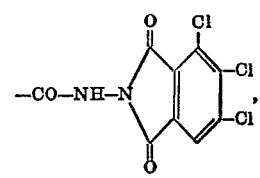

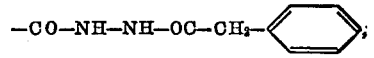

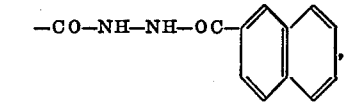

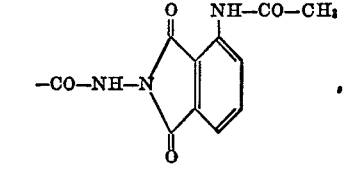

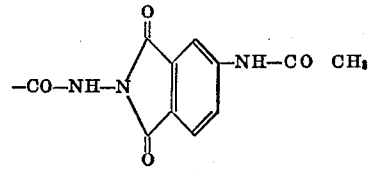

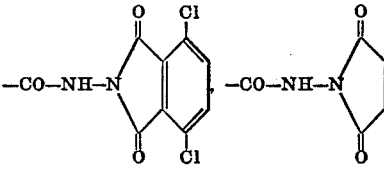

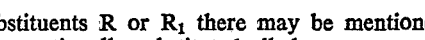

As substituents R or $R_1$ there may be mentioned, in particular: optionally substituted alkyl groups, especially those with 1–4 carbon atoms, such as methyl and ethyl groups; halogen atoms such as fluorine, chlorine and bromine; alkoxy groups such as methoxy and ethoxy groups; and trifluoromethyl groups.

Suitable radicals K are primarily the radicals of 2-hydroxy-naphthoic acid - (3) - arylides, acetoacetic acid arylides, pyrazolones-(5) and 5-amino-pyrazoles.

Preferred dyestuffs are those of the general formula

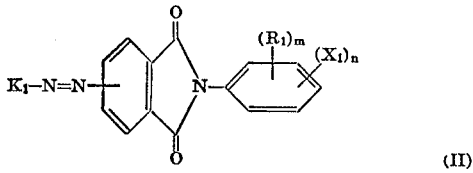

(II)

in which $K_1$ stands for the radical of a 2-hydroxy-naphthoic acid-(3)-arylide, acetoacetic acid arylide, pyrazolone-(5) or 5-amino-pyrazole; $R_1$, $m$ and $n$ have the same meaning as above; and $X_1$ stands for a carboxylic acid hydrazide group substituted by acyl, alkyl, aralkyl or aryl radicals, especially those of the formula

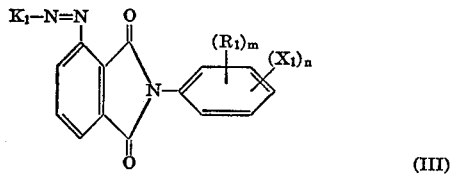

(III)

in which $B_1$, $X_1$, $K_1$, $m$ and $n$ have the same meaning as above.

The new azo dyestuffs of the Formula I are obtained by reacting azo compounds of the formula

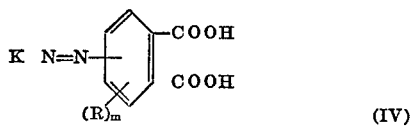

(IV)

in which K, R and $m$ have the same meaning as above, or their functional derivatives, such as anhydrides, semiesters or nueral esters, with compounds of the formula

(V)

in which $R_1$, X, $m$ and $n$ have the same meaning as above, in a molar ratio of about 1:1, optionally in the presence of suitable condensation agents, in a high-boiling organic solvent, the components being so chosen that the final dyestuffs are free from sulphonic acid groups.

A group of particularly valuable dyestuffs within the scope of the products of the Formula I are obtained by reacting compounds of the formula

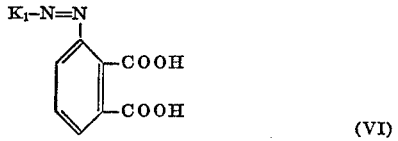

(VI)

in which $K_1$ has the same meaning as above, or functional derivatives of these dicarboxylic acids, especially the mono- and diesters or anhydrides, with compounds of the formula

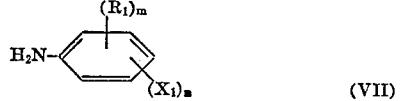

(VII)

dyestuffs of the Formula III being formed.

Another process for the preparation of azo dyestuffs of the Formula I consists in that amines of the formula

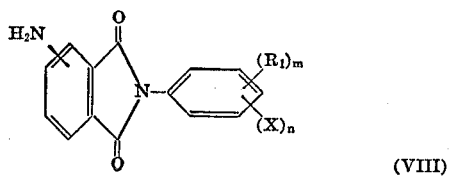

(VIII)

in which R, $R_1$, X, $m$ and $n$ have the same meaning as above, are diazotised in the usual way and the diazo compound is coupled with coupling components K—H.

The compounds of the Furmula VIII are obtained by the reaction of optionally substituted 3- and 4-nitrophthalic acids or their functional derivatives with compounds of the Formula V in a high-boiling organic solvent in the presence of acidic condensation agents and subsequent reduction of the resultant nitro compounds.

The starting dyestuffs of the Formulae IV and VI are obtained in the usual way by diazotising the optionally substituted amino-phthalic acids or their functional derivatives and coupling with monofunctional coupling components. The following diazo components can be used for this purpose, for example:

3- and 4-amino-phthalic acid,
3- and 4-amino-phthalic acid dimethyl ester,
3-amino-5-nitro-phthalic acid,
3-amino-6-methoxy-phthalic acid,
3-amino-4-methoxy-phthalic acid,
3-amino-6-chloro-phthalic acid,
3-amino-5,6-dimethoxy-phthalic acid,
4-amino-3-chloro-phthalic acid,
4-amino-5-chloro-phthalic acid,
4-amino-3-methyl-phthalic acid,
4-amino-5-methyl-phthalic acid,
4-amino-3-methoxy-phthalic acid,
4-amino-5-methoxy-phthalic acid and
4-amino-3,6-dichloro-phthalic acid.

Suitable monofunctional coupling components K-H are, for example:

2-hydroxy-naphthoic acid-(3)-anilide,
2-hydroxy-naphthoic acid-(3)-2'-methyl-anilide,
2-hydroxy-naphthoic acid-(3)-amide,
2-hydroxy-naphthoic acid-(3)-(4'-methyl)-anilide,
2-hydroxy-naphthoic acid-(3)-(2'-methoxy)-anilide,
2-hydroxy-naphthoic acid-(3)-(4'-methoxy)-anilide,
2-hydroxy-naphthoic acid-(3)-(3'-nitro)-anilide,
2-hydroxy-naphthoic acid-(3)-(2,4'-dimethyl)-anilide,
2-hydroxy-naphthoic acid-(3)-(2'-methyl-5-chloro)-anilide,
2-hydroxy-naphthoic acid-(3)-(4'-chloro)-anilide,
2-hydroxy-naphthoic acid-(3)-(2',5'-dimethoxy-4'-chloro)-anilide,
2-hydroxy-naphthoic acid-(3)-(2',4'-dimethoxy-5'-chloro)-anilide,
2-hydroxy-naphthoic acid-(3)(2'-methyl-4'-chloro)-anilide,
2-hydroxy-naphthoic acid-(3)-(2'methoxy-5'-chloro)-anilide,
2-hydroxy-naphthoic acid-(3)-(2'-methyl-3'-chloro)-anilide,
2-hydroxy-naphthoic acid-(3)-[naphthyl-(1')]-amide,
2-hydroxy-naphthoic acid-(3)-[naphthyl-(2')]-amide,
2-hydroxy-naphthoic acid-(3)-(2'-ethoxy)-anilide,
2-hydroxy-naphthoic acid-(3)-(4'-ethoxy)-anilide,
2-hydroxy-naphthoic acid-(3)-(2'-methoxy-5'-methyl)-anilide,
2-hydroxy-naphthoic acid-(3)-(4'-acetylamino)-anilide,
5-(2',3'-hydroxy-naphthoylamino)-benzimidazolone,
1-phenyl-3-methyl-pyrazolone-(5),
1-(4'-chlorophenyl)-3-methyl-pyrazolone-(5),
1-(3'-nitro-phenyl)-3-methyl-pyrazolone-(5),
1-(2'-chlorophenyl)-3-methyl-pyrazolone-(5),
1-phenyl-pyrazolone-(5)-carboxylic acid-(3)-amide,
1-phenylpyrazolone-(5)-carboxylic acid-(3)-methyl ester,
1-phenyl-3-methyl-5-aminopyrazole;
acetoacetic acid anilide,
acetoacetic acid-2-chloro-anilide,
acetoacetic acid-2,4-dimethyl-anilide,
acetoacetic acid-2-methyl-anilide, acetoacetic acid-2,5-dimethoxy-4-chloro-anilide,
acetoacetic acid-2-methoxy-anilide,
acetoacetic acid-[naphthyl-(1)]-amide,
acetoacetic acid-2-methyl-3-chloro-anilide,
acetoacetic acid-2-methyl-5-chloro-anilide,
acetoacetic acid-2-methyl-4-chloro-anilide,
acetoacetic acid-2,4-dichloro-anilide,
acetoacetic acid-2-nitro-4-chloro-anilide,
acetoacetic acid-2-nitro-4-methyl-anilide,
acetoacetic acid-2-nitro-4-methoxy-anilide,
acetoacetic acid-4-ethoxy-anilide,
acetoacetic acid-[6-ethoxy-benzothiazolyl-(2)]-amide,
5-acetoacetylamino-benzimidazolone.

The condensation of the azo compounds (IV) or (VI) with compounds of the type (V) according to the invention is preferably carried out in a high-boiling organic solvent and in the presence of dehydrating agents. The condensation is carried out, for example, at an elevated temperature, generally in the range from 80° C. to 240° C. and preferably between 100° C. and 180° C., possibly under pressure.

Compounds (V) which are suitable for the preparation of the azo dyestuffs of the Formula I are, for example:

N-phenyl-N'-(4-amino-benzoyl)-hydrazine,
N-methyl-N'-(4-amino-benzoyl)-hydrazine,
N-acetyl-N'-(4-amino-benzoyl)-hydrazine,
N-acetyl-N'-(3-amino-benzoyl)-hydrazine,
N-benzoyl-N'-(4-amino-benzoyl)-hydrazine,
N-(4-chlorobenzoyl)-N'-(4-amino-benzoyl)-hydrazine,
N-(4-methyl-benzoyl)-N'-(4-amino-benzoyl)-hydrazine,
N-(2,5-dichloro-benzoyl)-N'-(4-amino-benzoyl)-hydrazine,
N-(2,3,4,5-tetrachloro-benzoyl)-N'-(4-amino-benzoyl)-hydrazine,
N-cyclo-hexanyl-N'-(4-amino-benzoyl)-hydrazine,
N-[naphthoyl-(2)]-N'-(4-amino-benzoyl)-hydrazine,
N-(4-amino-benzoyl)-amino-phthalimide,
N-(3-amino-benzoyl)-amino-phthalimide,
N-(4-amino-benzoyl)-amino-3-acetamino-phthalimide,
N-(4-amino-benzoyl)-amino-4-acetamino-phthalimide,
3,5-bis-(N²-benzoyl-carbazinyl)-aniline.

Organic solvents suitable for the condensation of the monoazo dyestuffs (IV) or (VI) or their derivatives with the compounds (V) are the following solvents boiling above 80° C., for example: benzene, toluene, xylenes, chlorobenzene, o-, m-, p-dichlorobenzene, trichlorobenzenes, quinoline, nitrobenzene, glacial acetic acid cyclohexane, 1,2,3,4 - tetrahydronaphthalene, naphthalene, tetrachloroethylene, anisole, diphenyl ether, di-n-butyl ether, decaline, and mixtures of such solvents.

Condensation agents preferably to be added are, for example: acidic dehydrating agents such as formic acid, acetic acid, propionic acid, anhydrous sodium acetate, p-toluenesulphonic acid.

Particularly valuable condensation agents are acetic acid, propionic acid and mixtures thereof.

The reaction of the compounds (IV) and (VI) or of their derivatives with the compounds (V) is carried out in a molar ratio of about 1:1, preferably with an excess of 5 to 20% of the component (V), in order to achieve complete conversion.

The products which can be obtained according to the invention are valuable new pigment dyestuffs which are generally characterised by good fastness to light, solvents and migration as well as by good thermal stability in a variety of substrates. They are used for the colouring of papers, lacquers and synthetic materials, such as e.g. plasticiser-containing polyvinyl chloride, polyethylene and co- or graft-polymers of acrylonitrile-butadiene-styrene, and for the preparation of pigment pastes and printing colours.

In the following examples the temperatures are given in degrees centigrade.

EXAMPLE 1

10 g. of the azo dyestuff obtained from diazotised 3-amino-phthalic acid and 2-hydroxy-naphthoic acid-(3)-(4'-ethoxy)-anilide are heated in a mixture of 200 g. o-dichlorobenzene and 20 g. glacial acetic acid at 110° C. for 30 minutes. 6.8 g. N-(2,5-dichlorobenzoyl)-N'-(4-amino-benzoyl)hydrazine are then added, the mixture is heated at 110–120° C. for 10 hours, the product is filtered off with suction at 100° C., washed with hot o-dichlorobenzene and then with cold methanol, each time until the runnings are clear, and dried at 50° in a vacuum. The yield amounts to 13.6 g. of a red pigment dyestuff of the formula

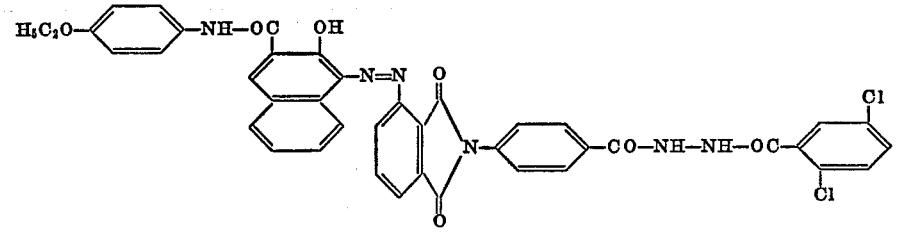

which is fast to lacquer-coating and very fast to light.

EXAMPLE 2

9.7 g. of the azo dyestuff obtained from diazotised 3-amino-phthalic acid and 2-hydroxy-naphthoic acid-(3)-(4'-methoxy)-anilide are heated in a mixture of 200 g. chlorobenzene and 20 g. glacial acetic acid at 110° C. for 1 hour, 5.8 g. N-(4-amino-benzyl)-amino-phthalimide are then added, the mixture is heated at 110–120° C. for a further 5 hours, the precipitated pigment is filtered off with suction at 100°, washed with 200 ml. of hot chlorobenzene and 150 ml. of cold methanol, and dried at 50° until the weight remains constant.

There are obtained 13.5 g. of a red pigment dyestuff of the formula

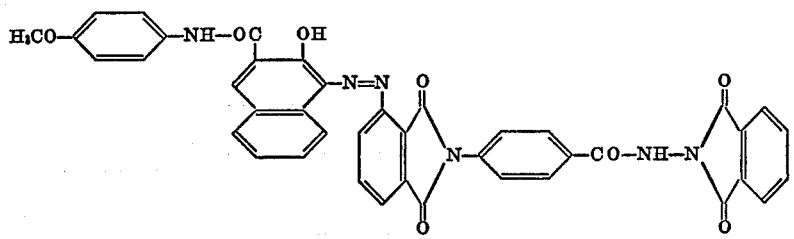

which is fast to lacquer-coating.

EXAMPLE 3

9.1 g. of the azo dyestuff obtained from diazotised 3-amino-phthalic acid and 2-hydroxy-naphthoic acid-(3)-anilide are heated in a mixture of 200 g. o-dichlorobenzene and 20 g. glacial acetic acid at 100° for 30 minutes, 6.0 g. N-(4-chloro-3-amino-benzoyl)-N'-(benzoyl)-hydrazine are then added, the mixture is heated at 120° for 10 hours, the product is filtered off with suction at 100°, washed with hot o-dichlorobenzene and cold methanol, each time until the runnings are clear, and dried in a vacuum at 50°. The yield amounts to 13.4 g. of a red pigment dyestuff of the formula

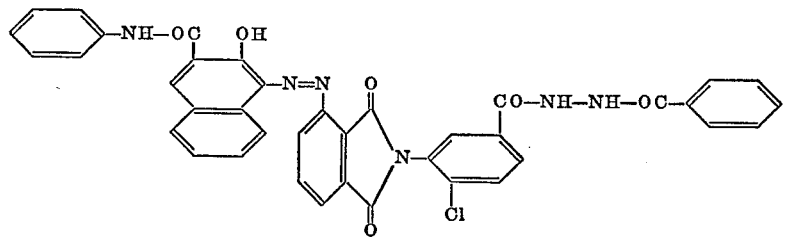

When the process is carried out according to the method described in the above examples but using, instead of the diazo, coupling and imidation components there mentioned, the diazo, coupling and imidation components listed in the following table, then valuable pigment dyestuffs are also obtained which exhibit the specified shades.

We claim:
1. A monoazo pigment dyestuff free from sulfonic acid groups having the formula

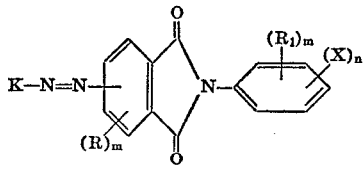

K is the radical of a monofunctional coupling component selected from the group consisting of 2-hydroxy-naphthoic-acid-(3)-arylide, acetoacetic acid arylide, pyrazolone-(5) and 5-amino-pyrazole;

R and $R_1$ are identical or different members selected from the group consisting of $C_1$–$C_4$-alkyl; trifluoromethyl; halogen; $C_1$–$C_4$-alkoxy and nitro;

X is hydrazino-carbonyl; or hydrazino carbonyl substituted in the N-atom distal to the carbonyl with a

| Diazo component | Coupling component | Imidation component | Shade |
|---|---|---|---|
| 3-aminophthalic acid. | 2-hydroxy-naphtholcacid-anilide | N-acetyl-N'-(4-amino-benzoyl)-hydrazine | Red. |
| Do. | do. | N-benzoyl-N'-(4-amino-benzoyl)-hydrazine | Red. |
| Do. | do. | N-(4-chlorobenzoyl)-N'-(4-amino-benzoyl)-hydrazine | Red. |
| Do. | do. | N-(2,5-dichlorobenzoyl)-N'-(4-amino-benzoyl)-hydrazine | Red. |
| Do. | do. | N-(4-amino-benzoyl)-amino-phthalimide | Red. |
| Do. | 2-hydroxy-naphthoic acid-(3)-(2'-methyl)-anilide | N-benzoyl-N'-(4-amino-benzoyl)-hydrazine | Red. |
| Do. | do. | N-(2,5-dichlorobenzoyl)-N'-(4-amino-benzoyl)-hydrazine | Red. |
| Do. | do. | 3,5-bis-(N²-benzoyl-carbazinyl)-aniline | Red. |
| Do. | 2-hydroxy-naphthoic acid-(3)-(4'-chloro)-anilide | N-benzoyl-N'-(4-amino-benzoyl)-hydrazine | Red. |
| Do. | do. | N-(4-chlorobenzoyl)-N'-(4-amino-benzoyl)-hydrazine | Red. |
| Do. | do. | N-(4-amino-benzoyl)-amino-phthalimide | Red. |
| Do. | 2-hydroxy-naphthoic acid-(3)-(3'-nitro)-anilide | 3,5-bis-[N-(4-chlorobenzoyl)-carbazinyl]-aniline | Red. |
| Do. | do. | N-(4-chlorobenzoyl)-N'-(4-amino-benzoyl)-hydrazine | Red. |
| Do. | 2-hydroxy-naphthoic acid-(3)-(2'-methyl-4'-methoxy)-anilide. | N-(2,3,4,5-tetrachlorobenzoyl)-N'-(4-aminobenzoyl)-hydrazine | Red. |
| Do. | do. | N-acetyl-N'-(4-amino-benzoyl)-hydrazine | Bordeaux. |
| Do. | do. | N-benzoyl-N'-(4-amino-benzoyl)-hydrazine | Do. |
| Do. | do. | N-(2,5-dichlorobenzoyl)-N'-(4-amionbenzoyl)-hydrazine | Do. |
| Do. | 2-hydroxy-naphthoic acid-(3)-[naphthyl-(1')]-amide. | N-benzoyl-N'-(4-amino-benzoyl)-hydrazine | Red. |
| Do. | do. | N-(2,5-dichlorobenzoyl)-N'-(4-amino-benzoyl)-hydrazine | Red. |
| Do. | do. | N-(4-amino-benzoyl)-aminophthalimide | Red. |
| Do. | 2-hydroxy-naphthoic acid-(3)-[naphthyl-(2')]-amide | do. | Red. |
| Do. | do. | 3,5-bis-[N²-(4-chlorobenzoyl)-carbazinyl]-aniline | Red. |
| Do. | do. | N-(2,3,4,5-tetrachlorobenzoyl)-N-(4-aminobenzoyl)-hydrazine | Red. |
| Do. | 2-hydroxy-naphthoic acid-(3)-(2'-ethoxy)-anilide | do. | Red. |
| Do. | do. | N-benzoyl-N'-(4-amino-benzoyl)-hydrazine | Red. |
| Do. | 2-hydroxy-naphthoic acid (3)-(4'-ethoxy)-anilide | N-acetyl-N'-(4-amino-benzoyl)-hydrazine | Red. |
| Do. | do. | N-benzoyl-N'-(4-amino-benzoyl)-hydrazine | Red. |
| Do. | do. | N-(2,3,4,5-tetrachlorobenzoyl)-N'-(4-amino-benzoyl)-hydrazine | Red. |
| Do. | do. | 3,5-bis-(N²-benzoyl-carbazinyl)-aniline | Red. |
| Do. | do. | N-(4-amino-benzoyl)-aminophthalimide | Red. |
| Do. | 2-hydroxy-naphthoic acid (3)-(4'-methoxy)-anilide | do. | Red. |
| Do. | do. | N-benzoyl-N'-(4-amino-benzoyl)-hydrazine | Red. |
| Do. | do. | N-(4-chlorobenzoyl)-N'-(4-aminobenzoyl)-hydrazine | Red. |
| Do. | do. | N-(4-chlorobenzoyl)-N'-(3-aminobenzoyl)-hydrazine | Red. |
| Do. | do. | N-(4-chlorobenzoyl)-N'-(3-amino-4-chloro-benzoyl)-hydrazine | Red. |
| Do. | Acetoacetic acid-2,5-dimethoxy-4-chloro-anilide | N-benzoyl-N'-(4-amino-benzoyl)-hydrazine | Yellow. |
| Do. | do. | N-(2,5-dichlorobenzoyl)-N'-(4-aminobenzoyl)-hydrazine | Do. |
| Do. | do. | N-(4-amino-benzoyl)-aminophthalimide | Do. |
| 4-aminophthalic acid. | 2-hydroxy-naphthoic acid-(3)-anilide | N-benzoyl-N'-(3-amino-benzoyl)-hydrazine | Red. |
| Do. | do. | N-benzoyl-N'-(4-amino-benzoyl)-hydrazine | Red. |
| Do. | do. | 3,5-bis-(N²-benzoyl-carbazinyl)-aniline | Red. |
| 4-amino-5-methoxy-phthalic acid. | 2-hydroxy-naphthoic acid-(3)-(4'-ethoxy)-anilide | do. | Red. |
| Do. | do. | N-benzoyl-N'-(4-amino-benzoyl)-hydrazine | Red. |
| Do. | do. | N-(2,3,4,5-tetrachlorobenzoyl)-N'-(4-amino-benzoyl)-hydrazine | Red. | member selected from the group consisting of $C_1$–$C_4$-alkyl; phenyl; benzyl; phenyl or benzyl substituted with halogen, nitro, $C_1$–$C_4$-alkyl or $C_1$–$C_4$-alkoxy; $C_1$–$C_4$-alkyl-carbonyl; naphthylcarbonyl; cyclohexylcarbonyl; diphenylcarbonyl; phenylcarbonyl; benzylcarbonyl; phenyl or benzylcarbonyl substituted in the phenyl nucleus with halogen, nitro, $C_1$–$C_4$-alkyl; or $C_1$–$C_4$-alkoxy; phthaloyl; or phthaloyl substituted in the phenyl nucleus with $C_1$–$C_4$-alkyl, $C_1$–$C_4$-alkoxy, phenyl, halogen, nitro, or $C_1$–$C_4$-alkyl carbonyl amino; $m$ is an integer from 0 to 3; and $n$ is 1 or 2.

2. The monoazo dyestuff of claim 1 in which the radical K is 2-hydroxy-naphthoic acid-(3)-arylide.

3. The monoazo dyestuff of claim 1 of the formula

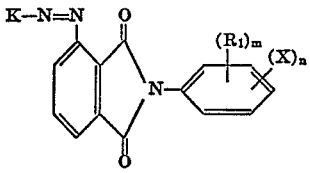

4. The monoazo dyestuff of claim 1 in which R and $R_1$ are the same or different members selected from the group consisting of $C_1$–$C_4$-alkyl; trifluoromethyl; fluoro; chloro; bromo; methoxy; ethoxy; and nitro;

X is hydrazino-carbonyl; or hydrazino carbonyl substituted in the N-atom distal to the carbonyl with a member selected from the group consisting of $C_1$–$C_4$-alkyl; phenyl; benzyl; phenyl or benzyl substituted with chloro, nitro, $C_1$–$C_4$-alkyl or methoxy; $C_1$–$C_4$-alkyl-carbonyl; naphthylcarbonyl; cyclohexylcarbonyl; diphenylcarbonyl; phenylcarbonyl; benzylcarbonyl; phenyl or benzyl carbonyl substituted in the phenyl nucleus with chloro, nitro, $C_1$–$C_4$-alkyl; or methoxy; phthaloyl; or phthaloyl substituted in the phenyl nucleus with $C_1$–$C_4$-alkyl, $C_1$–$C_4$-alkoxy, phenyl, chloro, nitro or $C_1$–$C_4$-alkyl carbonyl amino; $m$ is an integer from 0 to 3; and $n$ is 1 or 2.

References Cited
UNITED STATES PATENTS

| | | | |
|---|---|---|---|
| 3,454,550 | 7/1969 | Newland | 260—152 |
| 3,526,618 | 9/1970 | Horstmann et al. | 260—152 |
| 3,551,407 | 12/1970 | Dehnert et al. | 260—152 |
| 3,591,324 | 7/1971 | Dehnert et al. | 260—152 |

LEWIS GOTTS, Primary Examiner

C. F. WARREN, Assistant Examiner

U.S. Cl. X.R.
260—162, 326 A

UNITED STATES PATENT OFFICE
CERTIFICATE OF CORRECTION

Patent No. 3,743,632                Dated July 3, 1973

Inventor(s) Walter Horstmann et al

It is certified that error appears in the above-identified patent and that said Letters Patent are hereby corrected as shown below:

Column 2, line 53 "-CO CH$_3$" should read --- -CO-CH$_3$ ---.

Column 3, line 26, "B," should read ---R$_1$---

Column 3, line 32, "K N=N-" should read ---K-N=N- ---

Column 3, line 37, "nueral" should read ---neutral---

Column 4, line 4, "Furmula" should read ---Formula---

Column 4, line 40, After line 40 insert the following two sentences ---2-hydroxy-naphthoic acid-(3)-(2'-chloro)-anilide, 2-hydroxy-naphthoic acid-(3)-(4'-chloro)-anilide, ---

Column 4, line 44, after "-(3)-(" insert the following ---2'-methyl- ---

Column 4, line 49, "-chloro" should read --- -methoxy ---

Signed and sealed this 10th day of December 1974.

(SEAL)
Attest:

McCOY M. GIBSON JR.
Attesting Officer

C. MARSHALL DANN
Commissioner of Patents